United States Patent [19]

Williams

[11] 4,432,813
[45] Feb. 21, 1984

[54] PROCESS FOR PRODUCING EXTREMELY LOW GAS AND RESIDUAL CONTENTS IN METAL POWDERS

[76] Inventor: Griffith E. Williams, 3250 W. 4100 S., Salt Lake City, Utah 84119

[21] Appl. No.: 338,389

[22] Filed: Jan. 11, 1982

[51] Int. Cl.³ .............................................. B22F 1/00
[52] U.S. Cl. .................................. 148/125; 148/126.1
[58] Field of Search ........................... 75/0.5 R, 0.5 B; 148/126, 125

[56] References Cited

U.S. PATENT DOCUMENTS

| | | | |
|---|---|---|---|
| 1,852,583 | 4/1932 | Lucas | 148/126 |
| 3,697,255 | 10/1972 | Baldwin et al. | 148/126 |
| 4,141,719 | 2/1979 | Hakko | 148/126 |

Primary Examiner—W. Stallard
Attorney, Agent, or Firm—Remy J. VanOphem

[57] ABSTRACT

A process for removing residual and tramp elements including absorbed, adsorbed or otherwise occluded gases from metal powders is disclosed. The process includes sequentially subjecting the metal powder to the melting and boiling points of the residual elements to be removed while in a vacuum atmosphere. In the case of some gases, the process includes cryogenic cooling near absolute zero temperatures.

24 Claims, 7 Drawing Figures

TABLE I

RESIDUAL ELEMENTS HAVING MELTING AND BOILING POINTS ABOVE 0°C

*Fig-5*

| ELEMENT | SYMBOL | M.P.°C | B.P.°C |
|---|---|---|---|
| CADMIUM | Cd | 321 | 765 |
| CESIUM | Cs | 28.5 | 705 |
| IODINE | I | 113.6 | 185.2 |
| MAGNESIUM | Mg | 651 | 1110 |
| PHOSPHOROUS | P | 44.1 | 280 |
| POTASSIUM | K | 63.2 | 765.5 |
| SODIUM | Na | 97.8 | 881.4 |
| SULFUR | S | 112.8 | 444 |
| TELLURIUM | Te | 449.8 | 989.4 |
| ZINC | Zn | 419.5 | 908 |

TABLE II

RESIDUAL ELEMENTS HAVING MELTING AND BOILING POINTS BELOW 0°C

*Fig-6*

| ELEMENT | SYMBOL | M.P.°C | B.P.°C |
|---|---|---|---|
| ARGON | A | -189.4 | -185.9 |
| CHLORINE | Cl | -101 | -34 |
| FLOURINE | F | -219.6 | -188.1 |
| HELIUM | He | -272 | -268 |
| HYDROGEN | H | -259.2 | -252.8 |
| NITROGEN | N | -210 | -195.8 |
| OXYGEN | O | -218.4 | -182.9 |
| XENON | Xe | -111.8 | -108.1 |

TABLE III

RESIDUAL ELEMENTS HAVING MELTING POINTS BELOW 0°C AND BOILING POINTS ABOVE 0°C

*Fig-7*

| ELEMENT | SYMBOL | M.P.°C | B.P.°C |
|---|---|---|---|
| BROMINE | Br | -7.25 | 59.5 |
| MERCURY | Hg | -38.3 | 357.2 |

PROCESS FOR PRODUCING EXTREMELY LOW GAS AND RESIDUAL CONTENTS IN METAL POWDERS

BACKGROUND OF THE INVENTION

1. Field of the Invention

The invention is related to processes for producing metal powders having an extremely low gas and residual element concentration and in particular a time-temperature vacuum process based on the melting and boiling temperatures of the residual elements to be removed.

2. Prior Art

For years, metallurgists have recognized the need for high purity metals and, in particular, in the field of powder metallurgy as applied to the aircraft and aerospace industries. Although various methods and techniques are presently available for making relatively pure metals, the processes for converting these metals to powder form introduce gaseous inclusions and other contaminants, called residual or tramp elements, which are detrimental to subsequent processes. Typical methods for producing high quality metal powders are disclosed by Akers in U.S. Pat. No. 3,975,184, by Schlienger in U.S. Pat. No. 3,963,812, Kondo et al. in U.S. Pat. No. 3,887,402 and by Holland in U.S. Pat. No. 4,018,633. However, in all of these processes, the amount of trapped gases and residual or tramp elements are either increased or unaffected.

The prior art teaches several methods for the removal of trapped gases. The most common process used in industry today is to heat the metal in a vacuum such as taught by Roberts in U.S. Pat. No. 3,954,458. This process is extensively used in the vacuum tube industry where residual gases entrapped in the glass and metal are released inside the vacuum tube over a period of time. The released gases raise the pressure inside the vacuum tube and adversely affect its operation. The removal of residual oxygen by heating in a reducing atmosphere such as hydrogen is taught by Matt et al. in U.S. Pat. No. 3,744,993 as well as by Kondo et al. in U.S. Pat. No. 3,887,402 and Precht in U.S. Pat. No. 3,945,863. Another method for removing dissolved, absorbed or otherwise occluded gases from platinum is taught by Klemen in U.S. Pat. No. 3,511,640. In his process Klemen discloses mixing the metal powder to be degassed with an inert metal oxide powder and heating to about 1000° C. to 1800° C. for a period of time to dissipate substantially all the gases. The platinum powder is subsequently recovered by dissolving the metal oxide in an acid solution.

Disclosed herein is a new and different method for the removal of gases and residual elements from metallic powders by a time-temperature vacuum process based on the melting and boiling temperatures of the gas or residual element to be removed.

SUMMARY OF THE INVENTION

The invention is a process for removing gases and residual elements from a metal powder in which the metal powder is either heated or cooled in a vacuum atmosphere to the melting temperature of the residual gas or element to be removed. The metal powder is held at the melting temperature of the residual gas or element for a period from 5 to 30 minutes then elevated to the boiling temperature of the residual for a period of about 1 to 10 hours. The metal powder is then returned to room temperature in a vacuum or inert atmosphere. When two or more residuals are to be removed the metal powder is subjected to the melting temperature and boiling temperature of each residual element to be removed in turn.

One advantage of the disclosed process is that it is capable of removing residual gases or elements from metal powders more efficiently than any other known process. Another advantage of the process is that most gases can be removed cryogenically thus not subjecting the metal powder to high temperatures which could result in sintering or otherwise destroy the physical properties of the powder. These and other advantages will become apparent from reading the specification in connection with the drawings.

BRIEF DESCRIPTION OF THE DRAWINGS

FIGS. 5, 6 and 7 contain three tables listing the melting and boiling points of gases and residual elements.

DETAILED DESCRIPTION OF THE PREFERRED EMBODIMENT

Figure 1:
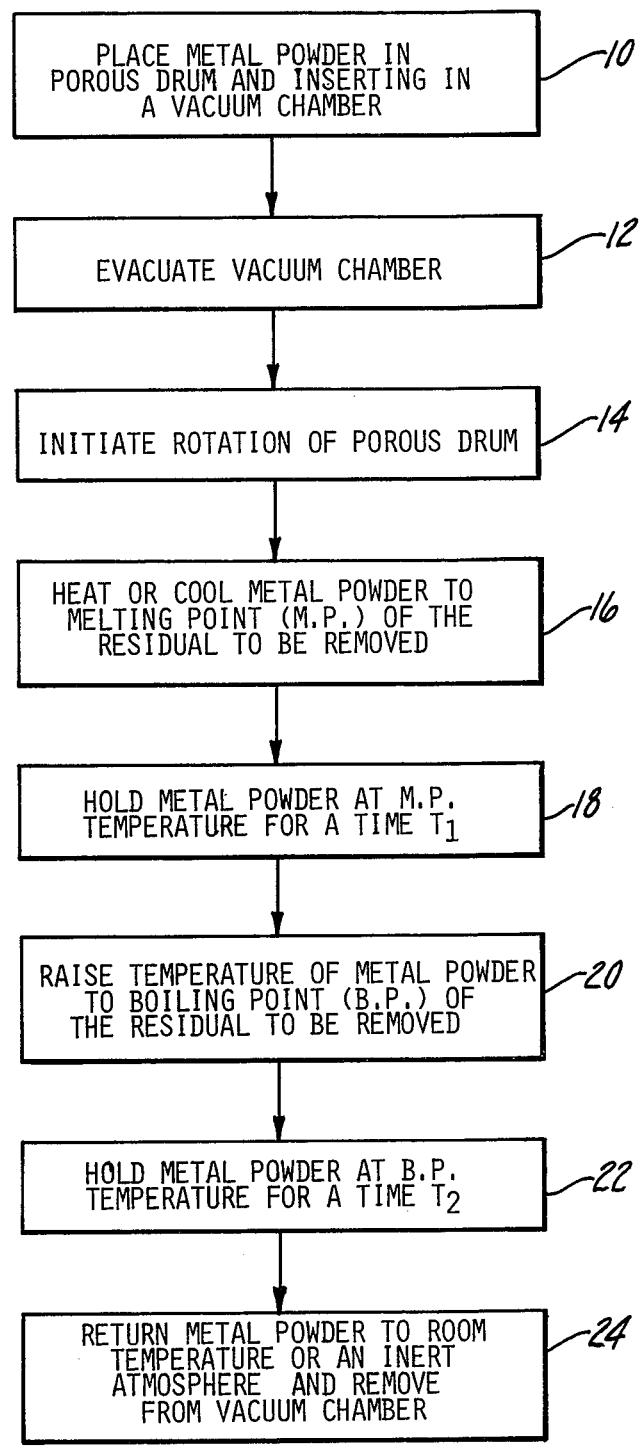
FIG. 1 is a flow diagram for the disclosed process.

The invention is a process for removing gases and residual elements from metal powders. The term "residual" as used herein means residual or "tramp" elements including dissolved, absorbed, adsorbed or otherwise occluded gases or any other unwanted elements. The basic process is shown in the flow diagram of FIG. 1. Metal powder made from a high purity metal is placed in a rotatable porous drum which is then inserted into a vacuum chamber as described in block 10. The porous drum may be made from a wire mesh or screen having apertures sufficiently small to retain the metal powder yet permit the gases or vapors evolved from the powders during the subsequent processing steps to escape and be removed by the vacuum pump. The drum may be mechanically or magnetically rotated by a motor external to the vacuum chamber using any of the various techniques known in the art. Magnet rotation of the porous drum is preferred over mechanical means since it does not require a rotating shaft or movable member passing through the walls of the vacuum chamber which could be a source of air leaks. The metal powder may be produced using any conventional method including those previously discussed. The vacuum chamber may include either cryogenic cooling or heating capabilities, or both, depending upon the residual to be removed. The vacuum chamber is then evacuated to a predetermined low pressure as described in block 12. Since the efficiency of the process for the removal of residuals is an inverse function of pressure within the vacuum chamber, the predetermined pressure is normally the minimum pressure obtainable within a reasonable period of time and depends upon the pumping capacity and minimum pressure capabilities of the vacuum pump. Preferably, the predetermined low pressure is less than 50 microns of mercury but the processes have been found to be effective in the removal of residuals at vacuum pressures in excess of 100 microns of mercury.

After the vacuum in the chamber has stabilized at the predetermined low pressure the rotation of the porous drum is initiated as described in block 14. Rotation of the porous drum tumbles the metal powder causing the particles to be momentarily levitated, thereby repetitively exposing all of the surfaces of the particles to the vacuum atmosphere. This enhances the release of entrapped gases and evolved residuals and prevents caking or sintering of the metal powder during the subsequent steps of the process.

With the pressure inside of the vacuum chamber stabilized at the predetermined pressure and the metal powder being tumbled in the rotating porous drum, the metal powder is heated or cryogenically cooled to the melting point (melting temperature) of the residual to be removed as described in block 16. After the metal powder reaches the melting temperature of the residual, it is momentarily held at that temperature for a period of time $T_1$ nominally ranging from 5 to 30 minutes as described in block 18.

The temperature of the metal powder is then elevated to the boiling point (boiling temperature) of the residual as described in block 20. After the metal powder reaches the boiling point (B.P.) of the residual, it is held at that temperature for a period of time $T_2$ nominally for 1 or more hours as described in block 22. Although the residual will be removed by omitting the step of temporarily holding the metal powders at the melting temperature of the residual to be removed, tests have repeatedly shown that the removal of the residuals is significantly enhanced when this step is included. It is further understood that this process is limited to the removal of residuals having melting and boiling points below the melting temperature of the metal powder being purified. Residuals having boiling points above the metal powder or any of its desired elements cannot be removed by this process since the metal powder would be melted or the desired element removed. For particular gaseous residuals such as oxygen ($O_2$), hydrogen ($H_2$) and nitrogen ($N_2$) gases, their removal from inside the vacuum chamber is accomplished by the boiling action of the gases as they are vaporized and are separated from the metal powders. The vaporized residuals are then exhausted through the vacuum pump port. The removal of these vapors may be enhanced during this period through the use of chips of a gettering material mixed in with the metal powder. Gettering materials, such as barium, strontium, calcium magnesium, titanium and tantulum are known to selectively assist in the removal of these gases or vapors by absorption, adsorption, chemeosorption, or any combination of these processes, and prevent their reentrance into the metal powders. These chips of gettering material are significantly larger than the particles of the metal powder so that they may be selectively removed at the end of the process.

If the process is for the removal of only one residual, the metal powder is returned to a room temperature in the vacuum or inert atmosphere prior to being removed from the vacuum chamber as described in block 14. When more than one residual is to be removed from the metal powder, the steps given in blocks 16 through 22 are repeated for each residual. In the process of cryogenically removing more than one residual it is preferred to first process the metal powder at the melting and boiling temperatures of the residual having the lowest melting and boiling points. The remaining residuals are then removed in an ascending temperature order such that the last residual to be removed has the highest melting and boiling points.

Figure 2:
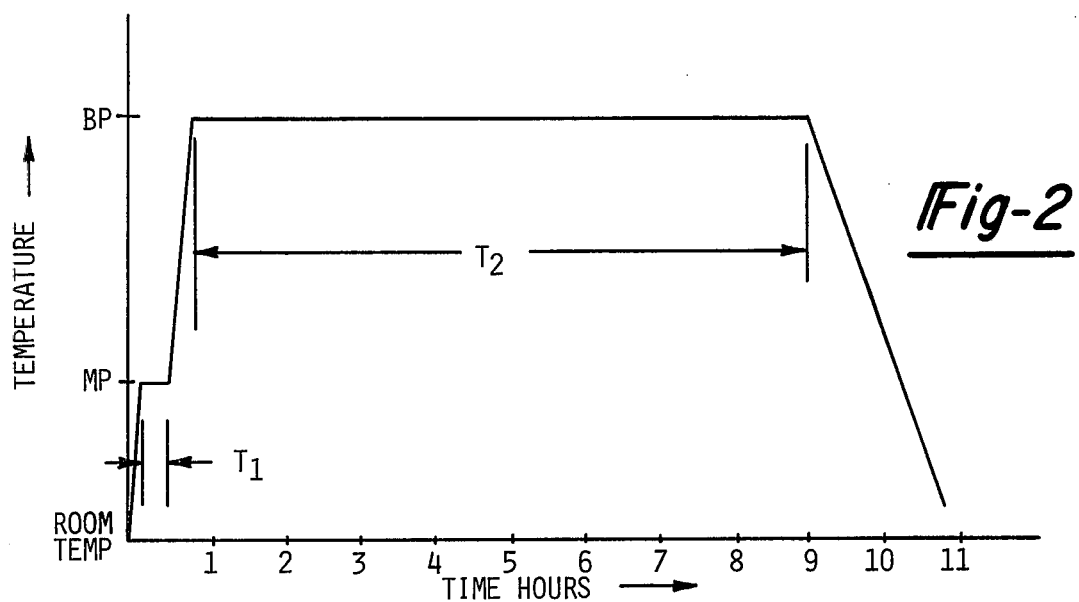
FIG. 2 is a graph showing the processing temperature as a function of time for removing a residual element having melting and boiling points above room temperature but below the melting point of the powdered metal and other desirable elements.

A typical temperature-time schedule for the removal of a residual from the metal powder having a melting point (M.P.) and boiling point (B.P.) which is greater than room temperature is shown in FIG. 2. For this type of residual, the metal powder is heated in a vacuum atmosphere at the melting point of the residual to be removed for a period of time $T_1$ ranging from 5 to 30 minutes. The temperature of the metal powder is then elevated to the boiling point (B.P.) of the residual where it is held at that temperature for a period of time $T_2$, nominally from 1 to 10 hours. It was found that by bringing the metal powder to the melting point of the residual to be removed for a short period of time, then bringing the metal powder to the boiling point of the residual, the residual is removed in a much shorter time when compared to going directly to boiling point. This has a distinct advantage since it reduces the processing time required to remove the residual. The metal powder is then allowed to return to room temperature in the vacuum atmosphere or in an inert atmosphere as previously described.

Figure 3:
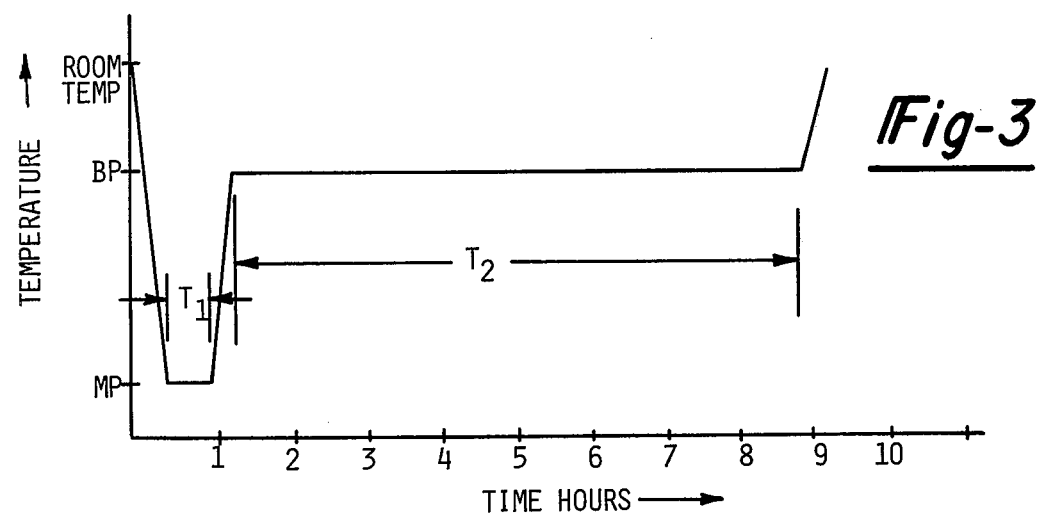
FIG. 3 is a graph showing the processing temperature as a function of time for removing a residual gas having melting and boiling points below room temperatures.

FIG. 3 is the time-temperature diagram for a residual having a melting and boiling point below room temperature. In this case, the metal powder is cryogenically cooled in a vacuum atmosphere to the boiling point of the residual desired to be removed. The metal powder is held at this temperature for the period of time $T_1$ nominally ranging from 5 to 30 minutes. The metal powder is then elevated to the boiling point (B.P.) of the residual where it is held for a period of time $T_2$ nominally ranging from 1 to 10 hours. The time $T_2$ may be shorter than 1 hour or longer than 10 hours depending upon the degree of purification desired and the residual to be removed. At the end of time $T_2$ the metal powder is allowed to warm up in the vacuum, or an inert atmosphere, to room temperature to prevent oxidation or other contamination of the powder.

Figure 4:
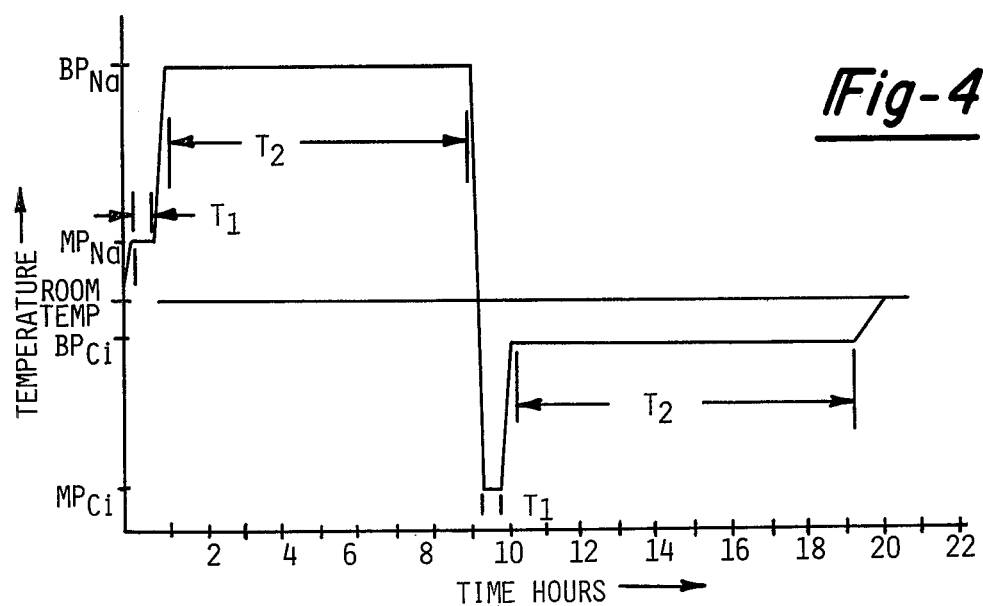
FIG. 4 is a graph showing the processing temperature as a function of time for removing two or more different residual elements.

FIG. 4 shows the time-temperature diagram for the removal of more than one residual from the metal powder, such as the removal of sodium chloride ($Na_{Cl}$) from a metal powder made from titanium sponge. In this case the metal powder is first heated in a vacuum atmosphere to the melting point of the sodium ($M.P._{Na}$) where it is held for a time $T_1$ then elevated to the boiling point of sodium ($B.P._{na}$) for a time $T_2$. The metal powder is then cryogenically cooled to the melting temperature of chlorine ($M.P._{Cl}$) and held there for a second period of time $T_1$. The temperature of the metal powder is then allowed to rise to the boiling point of chlorine ($B.P._{Cl}$) where it is held for a second period of time $T_2$ before allowing it to warm up to room temperature in the vacuum or inert atmosphere. The periods of time $T_1$ and $T_2$ have durations corresponding to those discussed with reference to FIGS. 2 and 3.

The melting points (M.P.) and boiling points (B.P.) of some of the more common residual elements are shown on tables presented on FIGS. 5, 6 and 7. Table I, given in FIG. 5, lists the residuals having both melting and boiling points at temperatues above 0° C. Table II, given on FIG. 6, lists the residuals having melting and boiling points at temperatures below 0° C. and Table III, of FIG. 7, lists several elements having melting points below 0° C. and boiling points above 0° C. The melting and boiling points (temperatures) listed on Tables I, II and III are those measured at atmospheric pressure (760 Torr) and are the temperatures used in the disclosed process. As will be noted, the melting temperatures of some of the gases, such as oxygen, hydrogen, and nitrogen, approach absolute zero (−273° C.). Therefore, in order to reduce the metal powder to these temperatures in accordance with the disclosed process, they must be cryogenically cooled using liquid helium.

Cryogenic cooling of metals has previously been used for purposes other than the removal of residuals. Lance et al, in U.S. Pat. No. 3,891,477, and Dullberg, in U.S. Pat. No. 3,185,600, disclose the use of cryogenic cooling to alter the microstructure of the materials to improve resistance to wear and corrosion. Alternatively, Holland, in U.S. Pat. No. 4,018,633, discloses cooling metal chips below the ductile-brittle transition point to increase impact fragmentation in the production of metal powders. None of the known prior art, however, teaches the use of cryogenic cooling for the removal of residuals.

The mechanism which produces the significant reduction in the residuals achieved by the disclosed process is bringing the residual to its boiling point and extracting the evolved vapors with a vacuum pump. The following test results are provided to show the effectiveness of the process.

TEST NUMBER 1

This test was designed to reduce the chlorine (Cl) residual in a 50 gram sample of titanium powder. The sample was cryogenically cooled in a vacuum to the melting temperature of chlorine ($\approx -101°$ C.) and held at that temperature for approximately 5 minutes. The sample was then allowed to warm up to the boiling point of chlorine ($\approx -35°$ C.). After 3 hours at −35° C. the sample was allowed to return to room temperature before removal from the vacuum chamber. The chlorine content of the sample prior to processing was 2,200 parts per million (ppm) and after processing the chlorine content was 50 parts per million.

TEST NUMBER 2

This test was designed to remove the oxygen residual from another 50 gram sample of titanium powder. The sample was cryogenically cooled at the melting point of oxygen ($\approx -218°$ C.) for 5 minutes then at the boiling point of oxygen ($\approx -183°$ C.) for 3 hours. The oxygen content of the sample was 1,200 parts per million (ppm) prior to the test, and 47 parts per million (ppm) after being processed.

TEST NUMBER 3

This test was designed to remove hydrogen, nitrogen and oxygen residuals from another 50 gram sample of titanium powder. The sample was cryogenically cooled to the melting point of hydrogen ($\approx -259°$ C.) for about 5 minutes. The temperature was then raised to the boiling point of hydrogen ($\approx -253°$ C.), the boiling point of nitrogen ($\approx -196°$ C.) and the boiling point of oxygen ($\approx -183°$ C.) in sequential order. The sample was held at each of these boiling points for approximately one (1) hour. The before and after concentrations of the three residuals were as follows:

| Residual | Before | After |
|---|---|---|
| Hydrogen | 70 ppm | 13 ppm |
| Nitrogen | 142 ppm | 26 ppm |
| Oxygen | 1,200 ppm | 63 ppm |

TEST NUMBER 4

This test was designed to remove the sodium (Na) residual from a 50 gram sample of titanium powder taken from the same batch as Test 3. The powder was heated in a vacuum atmosphere to the melting point of sodium for 5 minutes hours then to the boiling point of sodium ($\approx 882°$ C.) for 2 hours. The concentration of sodium prior to the test was 1,570 parts per million (ppm) and after the test the concentration was reduced to 800 parts per million (ppm).

In all of these tests, the concentration of the residuals was measured by an independent laboratory, Herron Testing Laboratories of Cleveland, Ohio.

It is not intended that the invention be limited to the removal of the residual elements and gases given in the examples but is applicable to removing any residual which has a melting and boiling temperature below the metal powder from which is is to be removed. Further, one skilled in the art will also recognize that the process is not limited to removing residuals from metal powders but also may be used to remove these same residuals from bulk materials and particular, bulk materials in the form of thin metal sheets, without departing from the spirit of the invention as described herein and set forth in the appended claims.

What is claimed is:

1. A method for removing residual elements including dissolved, absorbed, adsorbed or otherwise occluded gases from metal powders comprising the steps of:
   placing the metal powder in a vacuum chamber;
   evacuating said vacuum chamber to reduce the atmosphere surrounding the metal powder to a vacuum;
   subjecting the metal powder to the melting temperature of the residual element to be removed for a first predetermined period of time $T_1$;
   elevating the temperature of the metal powder to the boiling temperature of the residual element to vaporize the residual element;
   holding said metal powder at said boiling temperature for a second period of time $T_2$; and
   returning the metal powder from said boiling temperature to room temperature prior to removing the metal powder from said vacuum chamber.

2. The method of claim 1 wherein said step of subjecting comprises the step of heating said metal powder to the melting temperature of said residual.

3. The method of claim 2 wherein said method further comprises the step of continuously tumbling said metal powder to enhance the release of entrapped gases and evolved vapors and to prevent sintering when said metal powder is at said melting and boiling temperatures.

4. The method of claims 2 or 3 wherein said first predetermined time $T_1$, is between 5 and 30 minutes.

5. The method of claims 2 or 3 wherein said second predetermined time $T_2$ is between 1 and 10 hours.

6. The method of claim 1 wherein said step of subjecting comprises the step of cooling the metal powder to the melting temperature of the residual element to be removed.

7. The method of claim 6 wherein said method further comprises the step of tumbling said metal powder to enhance the release of entrapped gases and evolved vapors and to prevent sintering when said metal powder is at said melting and boiling temperatures.

8. The method of claim 6 wherein said first predetermined time $T_1$, is between 5 and 30 minutes.

9. The method of claims 7 and 8 wherein said second predetermined time $T_2$ is between 1 and 10 hours.

10. The method of claim 6 wherein said step of cooling further comprises the step of cryogenically cooling the metal powder to the melting temperature of said residual element.

11. The method of claim 10 wherein said step of cryogenically cooling is performed with liquid helium.

12. The method of claim 1 wherein said step of placing the metal powder in a vacuum chamber further comprises the step of mixing chips of a gettering material with said metal powder to assist in the removal of vaporized residual elements.

13. The method of claims 2 or 6 wherein said step of placing the metal powder in a vacuum chamber further comprises the step of mixing chips of a gettering material with said metal powder to assist in the removal of the vaporized residual elements.

14. The method of claim 1 wherein said metal powder has two or more residual elements to be removed, said method further comprises repeating said steps of subjecting, elevating and holding at the melting and boiling temperatures of each residual element.

15. A method for removing residual elements including dissolved, absorbed, adsorbed or otherwise occluded gases from metal powders comprising the steps of:
placing the metal powder in a vacuum chamber;
evacuating said vacuum chamber to produce a vacuum atmosphere about said metal powder;
heating said metal powder to the melting temperature of the residual element to be removed for a first predetermined period of time $T_1$;
elevating the temperature of said metal powder to the boiling temperature of the residual element to be removed;
holding said metal powder at said boiling temperature for a second predetermined period of time $T_2$; and
cooling said metal powder to room temperature in a noncontaminating atmosphere prior to removal from said vacuum chamber.

16. The method of claim 15 wherein said method further comprises the step of tumbling said metal powders to release entrapped gases and evolved vapors and to prevent sintering when said metal powder is at said melting and boiling temperatures.

17. The method of claims 15 and 16 wherein said step of placing said metal powder in a vacuum chamber further comprises the step of mixing chips of gettering material into said metal powder to assist in the removal of the residual element.

18. The method of claim 15 wherein said first predetermined period of time $T_1$ is between 5 and 30 minutes.

19. The method of claims 15 and 18 wherein said second predetermined period of time $T_2$ is greater than 1 hour.

20. A method for removing residual elements including dissolved, absorbed, adsorbed or otherwise occluded gases from metal powders comprising the steps of:
placing said metal powder in a vacuum chamber;
evacuating said vacuum chamber to produce a vacuum atmosphere about said metal powders;
cooling said metal powder to the melting temperature of the residual element to be removed for a first predetermined period of time $T_1$;
increasing the temperature of said metal powder to the boiling temperature of the residual to be removed;
holding said metal powder at said boiling temperature for a second period of time $T_2$; and
returning said metal powder to a temperature which will prevent moisture condensation on said metal powder prior to removal from said vacuum chamber.

21. The method of claim 20 wherein said step of placing said metal powder in a vacuum chamber further comprises the step of tumbling said metal powder to enhance the release of entrapped and evolved gases and to prevent caking of said metal powder.

22. The method of claim 21 wherein said step of placing said metal powder in a vacuum chamber further comprises the step of mixing chips of a gettering material into said metal powder to assist in the removal of the residual element.

23. The method of claims 20 or 21 wherein said first predetermined period of time $T_1$ is between 10 and 30 minutes.

24. The method of claim 23 wherein said second predetermined period of time $T_2$ is greater than 1 hour.

* * * * *

UNITED STATES PATENT AND TRADEMARK OFFICE
CERTIFICATE OF CORRECTION

PATENT NO. : 4,432,813
DATED : February 21, 1984
INVENTOR(S) : Griffith E. Williams It is certified that error appears in the above-identified patent and that said Letters Patent is hereby corrected as shown below:

Column 3, line 7, after "pressure" insert a comma ---- , ----.

Column 6, line 14, delete "hours" and insert ---- and ----.

In the Claims

Column 7, line 37, delete "the" and insert ---- said ----.

Signed and Sealed this

Twelfth Day of March 1985

[SEAL]

Attest:

DONALD J. QUIGG

*Attesting Officer*     *Acting Commissioner of Patents and Trademarks*